(12) United States Patent
Spyche, Jr. et al.

(10) Patent No.: US 9,752,848 B2
(45) Date of Patent: Sep. 5, 2017

(54) RECOIL SHOCK ABSORBER FOR LONG BARREL FIREARMS

(71) Applicant: Kyntec Corporation, Cheektowaga, NY (US)

(72) Inventors: Gerald J. Spyche, Jr., South Wales, NY (US); Thomas J. Miller, Clarence, NY (US)

(73) Assignee: Kyntec Corporation, Cheektowaga, NY (US)

( * ) Notice: Subject to any disclaimer, the term of this patent is extended or adjusted under 35 U.S.C. 154(b) by 0 days.

(21) Appl. No.: 15/074,200

(22) Filed: Mar. 18, 2016

(65) Prior Publication Data

US 2016/0273873 A1 Sep. 22, 2016

Related U.S. Application Data

(60) Provisional application No. 62/135,361, filed on Mar. 19, 2015.

(51) Int. Cl.
*F41C 23/06* (2006.01)
*F16F 9/18* (2006.01)

(52) U.S. Cl.
CPC ............... *F41C 23/06* (2013.01); *F16F 9/18* (2013.01); *F16F 2230/0052* (2013.01)

(58) Field of Classification Search
CPC ... F41C 23/06; F16F 9/096; F16F 9/18; F16F 9/443; F16F 9/446; F16F 2230/0052; F41A 3/78–3/94
See application file for complete search history.

(56) References Cited

U.S. PATENT DOCUMENTS

| 2,973,694 | A | * | 3/1961 | Friedrich | F41A 3/90 267/64.23 |
| 3,528,531 | A | * | 9/1970 | Watson | F16F 9/443 188/315 |
| 3,561,575 | A | * | 2/1971 | Allinquant | F16F 9/443 188/282.5 |
| 3,707,797 | A | * | 1/1973 | Ruth | F41C 23/06 42/74 |
| 3,763,970 | A | * | 10/1973 | Anderson | F16F 9/443 188/282.1 |

(Continued)

*Primary Examiner* — Stephen M Johnson
*Assistant Examiner* — Joshua Semick
(74) *Attorney, Agent, or Firm* — Bond, Schoeneck & King, PLLC

(57) ABSTRACT

Embodiments of the present invention provide significant firearm recoil force reduction and can be integrated within a traditional firearm stock. Such recoil shock absorbers include a body assembly, plunger assembly, and return spring. The body assembly includes a shock tube, cylinder end, and accumulator. The shock tube includes an opening at its distal end, the cylinder end is rotably coupled to the shock tube, and the accumulator is coupled to the cylinder end. The cylinder end can be selectably/adjustably aligned with the shock tube opening, resulting in a selectable/adjustable orifice and a pathway from the shock tube to the accumulator. The plunger assembly is slidably coupled to the body assembly and includes a piston. The piston and the shock tube are in slidable relation such that when the plunger assembly is introduced into the body assembly the piston is introduced into the shock tube.

10 Claims, 5 Drawing Sheets

(56) References Cited

U.S. PATENT DOCUMENTS

| | | | | |
|---|---|---|---|---|
| 4,388,855 A * | 6/1983 | Sokolovsky | ............... | F41A 3/92 89/196 |
| 4,439,943 A * | 4/1984 | Brakhage | ................ | F41C 23/06 42/74 |
| 4,546,959 A * | 10/1985 | Tanno | .................... | F16F 9/096 188/285 |
| 6,880,684 B1 * | 4/2005 | Evans | .................... | F16F 9/466 188/313 |
| 7,159,505 B2 * | 1/2007 | Trendall | ................... | F41A 3/94 89/191.01 |
| 7,681,351 B2 * | 3/2010 | Bucholtz | ................ | F41C 23/06 42/1.06 |
| 7,854,221 B1 * | 12/2010 | Gore | .................... | F41B 11/642 124/63 |
| 8,939,059 B2 * | 1/2015 | Coffman, II | .............. | F41A 3/82 89/177 |
| 9,417,032 B1 * | 8/2016 | Chiang | ................... | F41C 23/14 |
| 2006/0254414 A1 * | 11/2006 | Kuczynko | ................ | F41A 3/84 89/198 |
| 2011/0138668 A1 * | 6/2011 | Thomas | ................. | F41C 23/06 42/1.06 |

\* cited by examiner

RECOIL SHOCK ABSORBER FOR LONG BARREL FIREARMS

RELATED APPLICATION

This application claims the benefit of U.S. Provisional Application No. 62/135,361, filed on Mar. 19, 2015. The entire teachings of the above application are incorporated herein by reference.

BACKGROUND OF THE INVENTION

The disclosure relates to a recoil shock absorber that is especially, but not exclusively, for shoulder-fired firearms, such as rifles and shotguns. Such firearms are known to cause a strong rear-ward kick in the direction of the operator of the firearm when discharged.

SUMMARY OF THE INVENTION

Embodiments of the present invention provide significant firearm recoil force reduction and can be integrated within a traditional firearm stock. Embodiments of the present invention provide selectable and adjustable hydraulic damping, the ability to easily interchange springs for optimum spring rates, built in over-pressurization protection (which allows the product to safely depressurize when overloaded while retaining baseline functionality), and a provision for non-linear spring rates (e.g., bifurcated, progressive, or tri-furcated rates are possible).

The combination of any of these features allows an operator of the firearm to adjust the recoil device to suit specific needs at the time of operation (e.g., for that day). Embodiments also allow a manufacturer to use, for example, a single molded device to meet multiple application requirements with a minimum amount of product manufacturing variation, providing a significant advantage in manufacturing costs, quality, and variation reduction. In one example embodiment, the device may include a limited number of mechanical parts, many of which can be molded of composite or other similar material to provide for economical manufacturing costs.

One example embodiment of the present invention is a recoil shock absorber that includes a body assembly, plunger assembly, and return spring. The body assembly is shaped such that it can be installed in a stock of a firearm and includes a shock tube, cylinder end, and accumulator chamber. The shock tube includes an opening at its distal end, the cylinder end is rotably coupled to the shock tube at the distal end, and the accumulator chamber is coupled to the cylinder end. The cylinder end includes multiple openings that can be selectably aligned with the shock tube opening. Alignment of the shock tube opening and a particular one of the cylinder end openings creates a resulting orifice and pathway from the shock tube, through the cylinder end, and to the accumulator chamber. The plunger assembly is slidably coupled to the body assembly and includes a piston at the proximal end of the shock tube. The piston and the shock tube are in slidable relation such that when the plunger assembly is introduced into the body assembly the piston is introduced into the shock tube. The return spring is coupled to the piston and the shock tube.

In such embodiments, the shock tube opening may be selectably aligned with a particular opening of the cylinder end by rotating the shock tube using an interface at the proximal end of the recoil shock absorber in the plunger assembly, and the shock tube may be adjusted to enable partial alignment of the shock tube opening with a particular opening of the cylinder end.

Another example embodiment is a recoil shock absorber that includes a body assembly, plunger assembly, and return spring. The body assembly is shaped such that it can be installed in a stock of a firearm and includes a shock tube, cylinder end, and accumulator chamber. The shock tube includes an opening at its distal end, the cylinder end is rotably coupled to the shock tube at the distal end, and the accumulator chamber is coupled to the cylinder end. The cylinder end includes a tapered protrusion that can be adjustably aligned with the shock tube opening. Alignment of the shock tube opening and a particular part of the cylinder end tapered protrusion creates a resulting orifice and pathway from the shock tube, through the cylinder end, and to the accumulator chamber. The plunger assembly is slidably coupled to the body assembly and includes a piston at the proximal end of the shock tube. The piston and the shock tube are in slidable relation such that when the plunger assembly is introduced into the body assembly the piston is introduced into the shock tube. The return spring is coupled to the piston and the shock tube.

In such embodiments, the shock tube opening may be adjustably aligned with a particular part of the cylinder end tapered protrusion by rotating the shock tube using an interface at the proximal end of the recoil shock absorber in the plunger assembly. The cylinder end tapered protrusion may taper from a first depth to a second depth, where the first depth is less than the second depth, and in many embodiments the first depth may be approximately zero and the second depth may be approximately equal to the size of the shock tube opening. In many of the above embodiments, the shock tube may be rotated using a common choke key. In some embodiments the cylinder end may include at least one return path with a check valve, and in further or other embodiments the recoil shock absorber may include an over-pressurization relief mechanism to vent excess pressure to the accumulator chamber while allowing the recoil shock absorber to continue to function as a shock absorber. Some embodiments may include a mechanical spring element that provides a progressive force rate over the linear stroke of the device, or multiple mechanical spring elements each configured to provide a different force rate over the linear stroke of the device, in which case at least one of the multiple mechanical spring elements may provide a progressive force rate over the linear stroke of the device.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
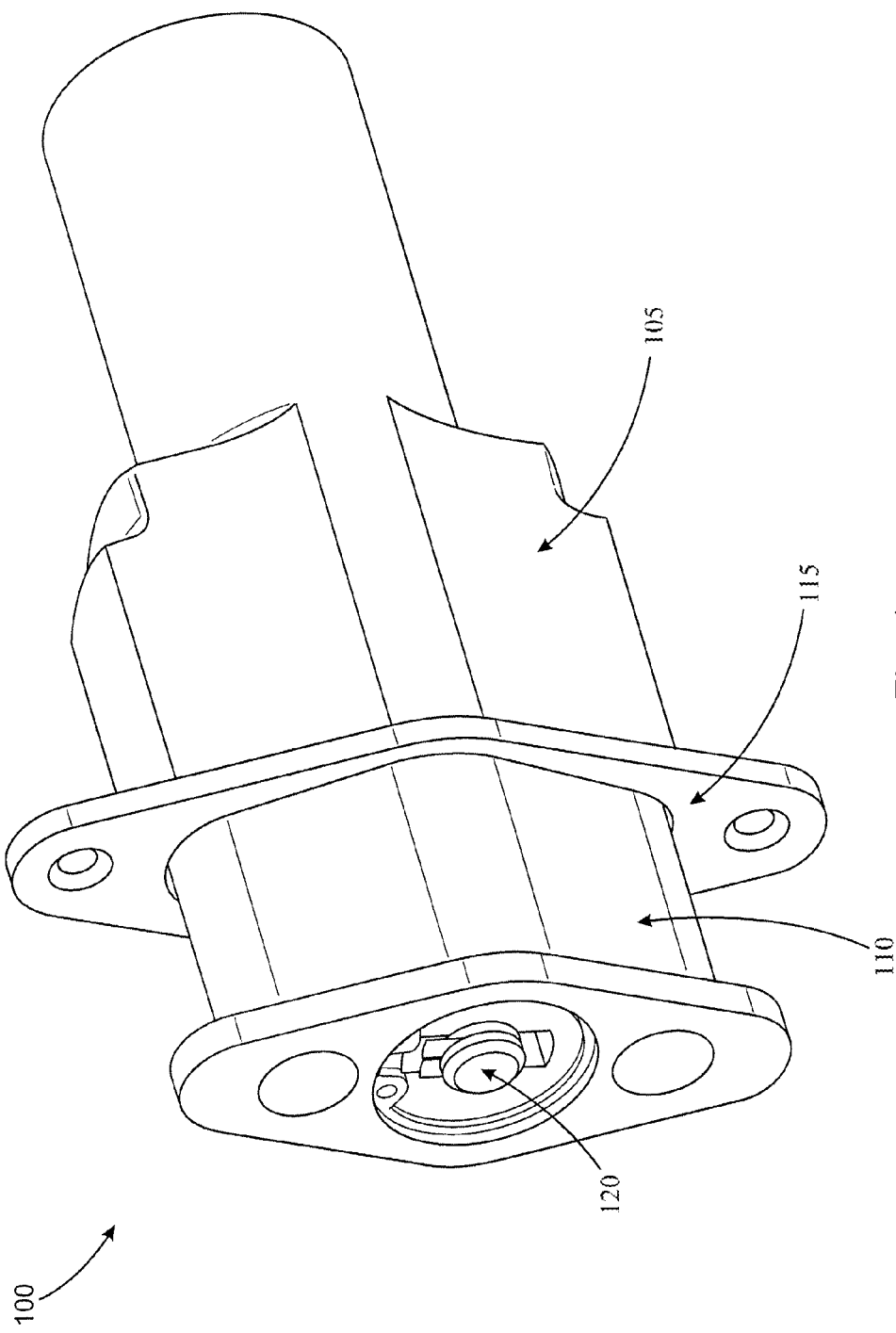
FIG. 1 is a schematic diagram illustrating a recoil shock absorber for a firearm, according to an example embodiment of the present invention.

FIG. 1 is a schematic diagram illustrating a recoil shock absorber 100 for a firearm, according to an example embodiment of the present invention. The recoil shock absorber 100 includes a body assembly 105, plunger assembly 110, and return spring (not visible in FIG. 1). The body assembly 105 is shaped such that it can be installed in a stock of a firearm and the plunger assembly 110 is slidably coupled to the body assembly 105. The body assembly 105 may include a mounting bracket 115 for securing the device 100 to a firearm, and, as described below, the device can include a selection/adjustment interface 120. Under the influence of firearm discharge, the plunger assembly 110 is compressed axially into the body assembly 105, which causes an internal chamber ("shock tube," not visible in FIG. 1) filled with hydraulic or other fluid to reduce in size. The firearm's recoil forces the body assembly 105 toward the plunger 110, and the shoulder of the firearm operator, for example, forces the plunger assembly 110 towards the body assembly 105.

Figure 2:
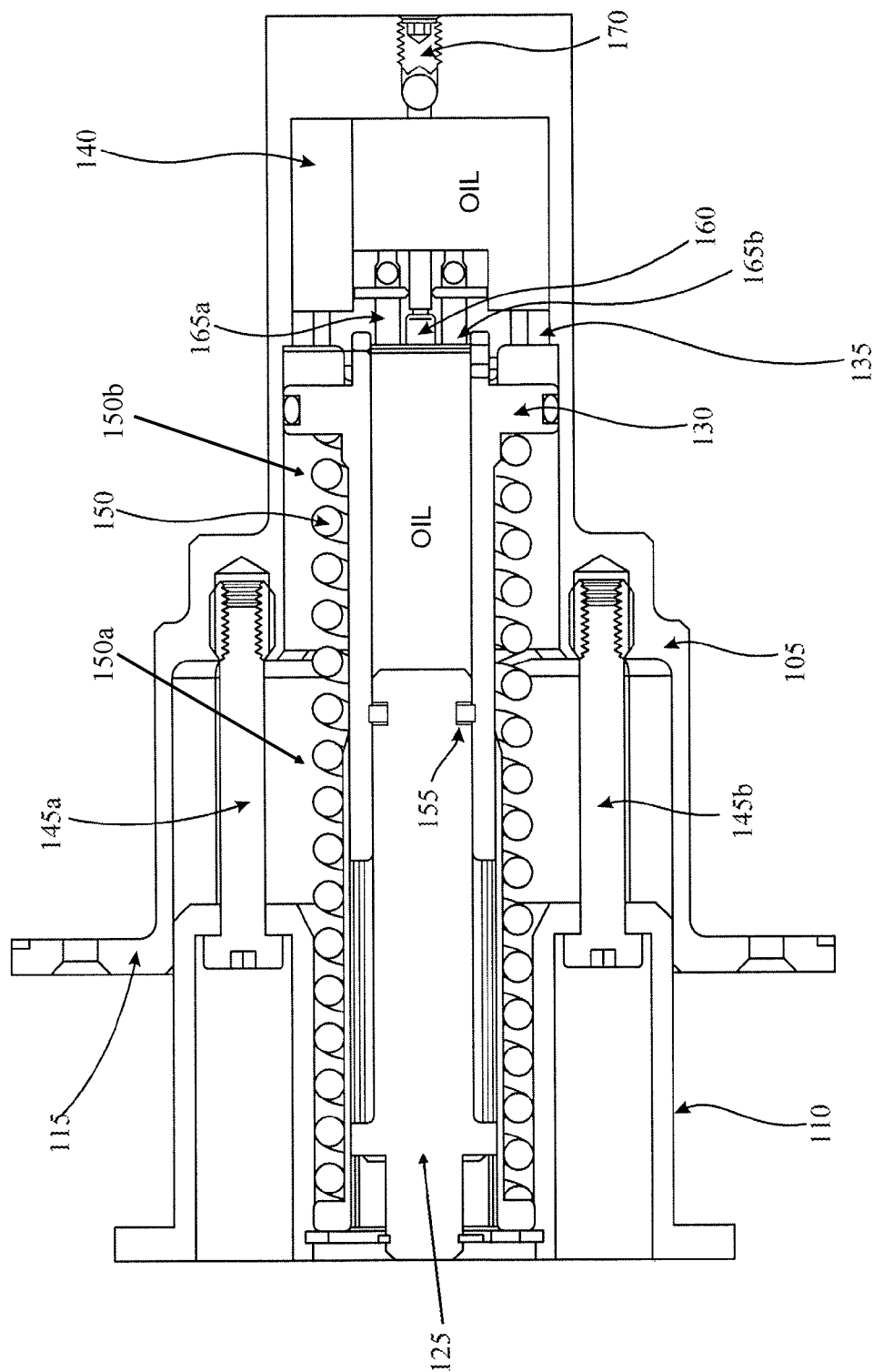
FIG. 2 is a schematic diagram illustrating a cross sectional view of the recoil shock absorber of FIG. 1, according to an example embodiment of the present invention.

FIG. 2 is a schematic diagram illustrating a cross sectional view of the recoil shock absorber 100 of FIG. 1, according to an example embodiment of the present invention. As shown, the body assembly 105 includes a shock tube 130, cylinder end 135, and accumulator chamber 140. The shock tube 130 includes an opening at its distal end, the cylinder end 135 is rotatably coupled to the shock tube 130 at the distal end, and the accumulator chamber 140 is coupled to the cylinder end 135. The plunger assembly 110 includes a piston 125 at the proximal end of the shock tube 130. The piston 125 and the shock tube 130 are in slidable relation such that when the plunger assembly 110 is introduced into the body assembly 105 the piston 125 is introduced into the shock tube 130, The return spring 150 is coupled to the piston 125 and the shock tube 130. The plunger assembly 110 and body assembly 105 may also be coupled by guide pins 145 a,b. As shown in FIG. 2, The return spring 150 can include a mechanical spring element configured to provide a progressive force rate over the linear stroke of the device. Optionally, also shown in FIG. 2, the return spring can include multiple mechanical spring elements 150a, 150b, each configured to provide a different force rate over the linear stroke of the device. At least one of the multiple mechanical spring elements can be configured to provide a progressive force rate over the linear stroke of the device.

The outside diameter of the piston 125 and the inside diameter of the shock tube 130 may be a close mechanical fit such that when a volume of the hydraulic chamber of the shock tube 130 (e.g., filled with oil or other fluid) is reduced by introduction of the piston 125, hydraulic fluid (e.g., oil) is forced out of the shock tube 130 through an opening 305 (FIG. 3) located at the end of the shock tube 130. In addition, or in the alternative, a seal 155 may be incorporated to provide a fluid-tight seal between the piston 125 and the shock tube 130. Hydraulic fluid may be added to or removed from the device through an opening sealed by a fill plug 170. The end of the shock tube 130 containing the opening 305 is rotably coupled to, for example as in the embodiment of FIG. 4, a cylinder end 405 that includes multiple openings 410a-d configured to pair with the shock tube opening 305. Each of the multiple openings 410a-d of the cylinder end 405 may be of a different size, such that when paired with the shock tube opening 305, the interface of the particular opening and the shock tube opening creates a resulting orifice that is a different size from other such parings. This allows the size of the resulting orifice to be selectable, thereby making the resistance on the volume of the hydraulic chamber of the shock tube 130 selectable. The resulting orifice may be selected by, for example, rotating the shock tube 130 such that the shock tube opening 305 aligns with a particular one of the cylinder end's multiple openings 410a-d. The hydraulic fluid being forced out of the shock tube 130 flows through the selectable, adjustable orifice and through additional passageway(s) in the cylinder end 135 to an accumulator chamber 140. The accumulator chamber 140 includes an accumulator that may be of a variety of compressible substances, including, for example, air or foam. Additionally, the resulting orifice may be further adjusted ("fine-tuned") by slightly rotating the shock tube 130 to partially close the resulting orifice by overlapping sides of the shock tube opening 305 and the particular cylinder end opening.

After the firearm is discharged and the plunger assembly 110 has been compressed axially into the body assembly 105, a return spring 150 moves the plunger assembly 110 and the body assembly 105 away from each other and into their original pre-discharge positions. During movement of the plunger assembly 110 and the body assembly 105 away from each other, the piston 125 moves away from the cylinder end 135, drawing hydraulic fluid back into the shock tube 130 from the accumulator chamber 140. The cylinder end 135 can include at least one return path 165a,b with a suitable mechanism for check relief (e.g., a check ball, valve plate etc.) that allows the hydraulic fluid to quickly move back to the shock tube 130 with little resistance. The check relief prevents hydraulic fluid from moving out of the shock tube via the return path(s) 165a,b during compression of the device 100 (i.e., during discharge of the firearm).

Figure 3:
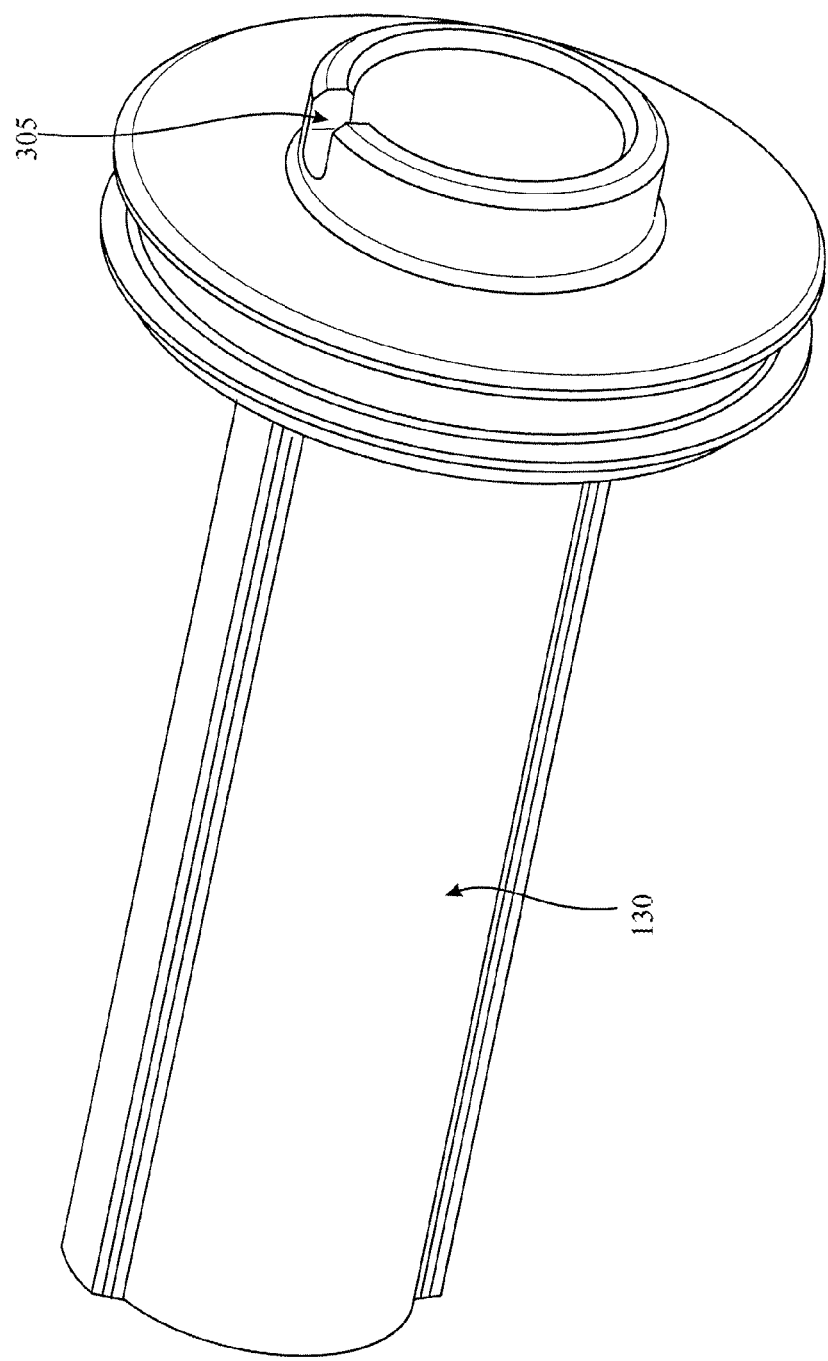
FIG. 3 is a schematic diagram illustrating a shock tube, according to an example embodiment of the present invention.
Figure 4:
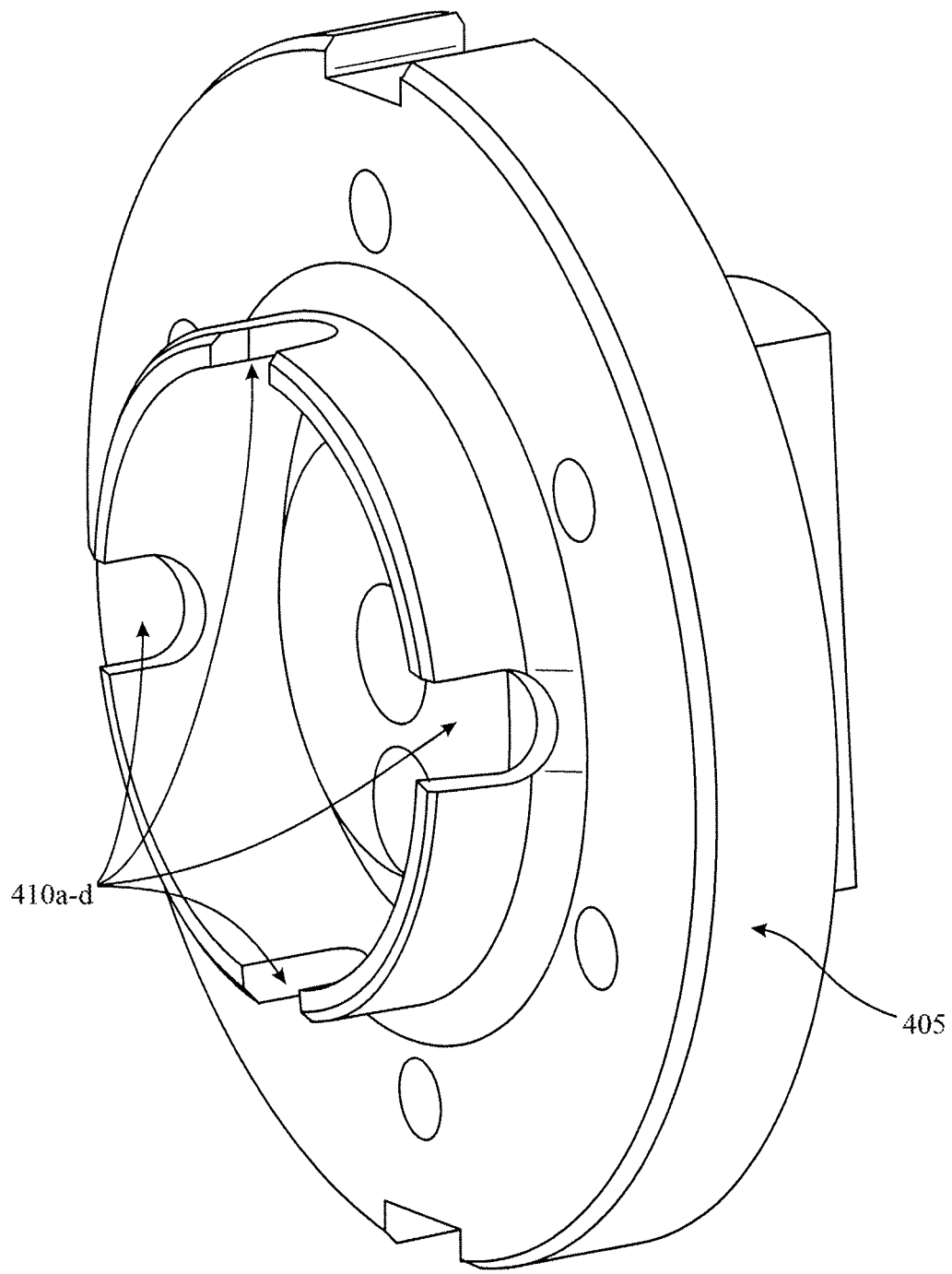
FIG. 4 is a schematic diagram illustrating a cylinder end including multiple openings, according to an example embodiment of the present invention.

FIG. 3 is a schematic diagram illustrating a shock tube, and FIG. 4 is a schematic diagram illustrating a cylinder end including multiple openings, according to example embodiments of the present invention. As shown in FIGS. 3 and 4, the openings of the shock tube 130 and cylinder end 405 can be slots with open ends. In such case, when the slot of the shock tube 305 is paired with a particular slot of the cylinder end 410a-d, an orifice is created. The device 100 can be adjusted without disassembly by using a common firearm accessory (e.g., a choke key). Using such an accessory, the operator can coarsely select a specific active orifice, i.e., open a specific flow path through the shock tube 130 and cylinder end 405, and cover/close other flow paths through the shock tube 130 and cylinder end 405. The operator can further fine-tune the device 100 by rotating the shock tube 130 to cover only a portion of the coarsely-selected flow path; thus, providing fine-tuned orificing unique to the operator's preference. The recoil device may also be modified by the shooter to remove and exchange the return spring 150 with a spring of a different rate, or one with various non-linear spring rate volumes, using only a common choke wrench/key. The device may also include an over-pressurization relief mechanism 160 (FIG. 2). If the operator adjusts the device 100 to an effective orifice size that is too small or too restrictive such that it causes an over-pressurization condition, the built in relief mechanism 160 can activate and cause the excess pressure to vent directly into the low pressure accumulator chamber 140. The device 100 will thereafter continue to function, but with a larger effective orifice (resulting from the relief mechanism activation) from the time of failure and onward.

Figure 5B:
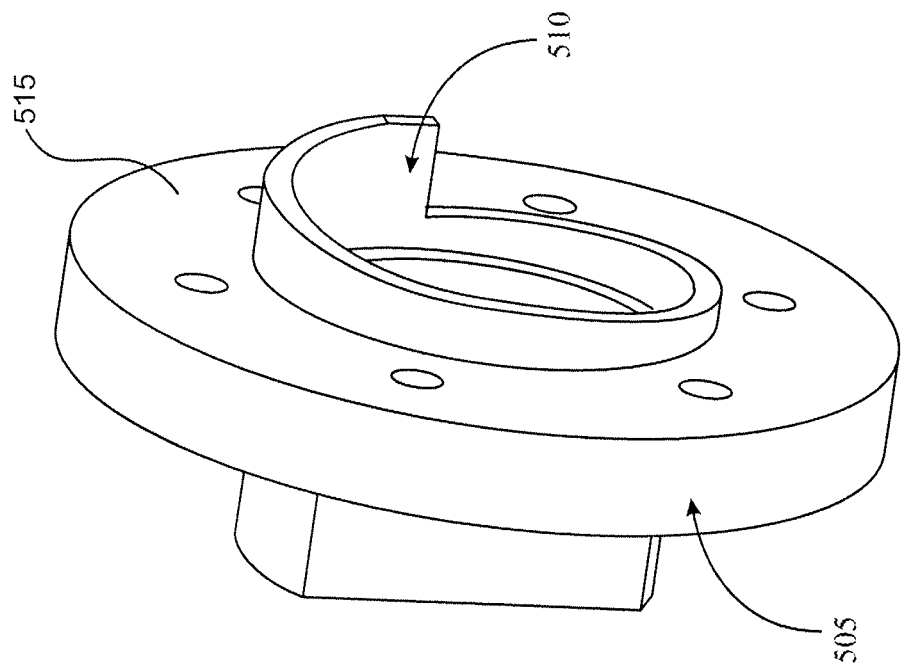
FIGS. 5A and 5B are schematic diagrams illustrating a cylinder end including a tapered protrusion, according to an example embodiment of the present invention.
Figure 5A:
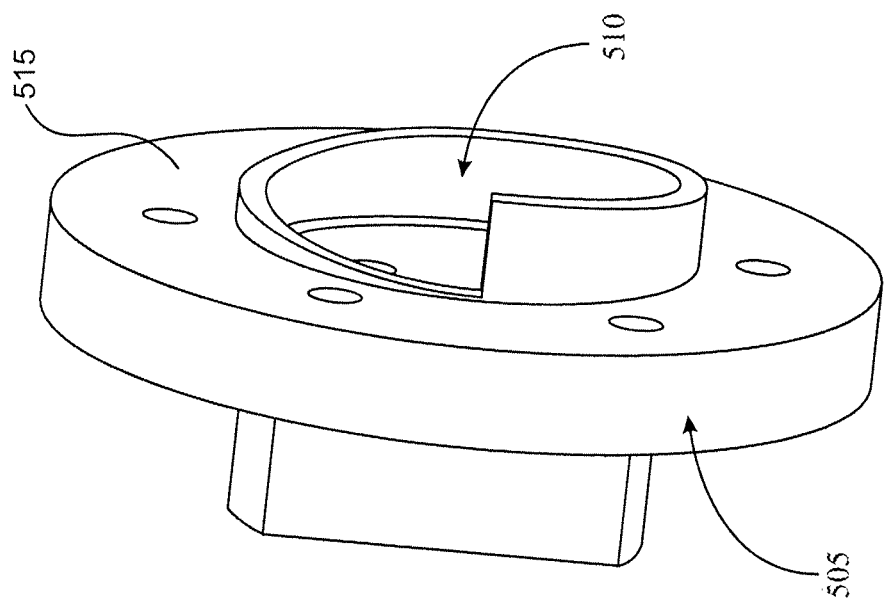

FIGS. 5A and 5B are schematic diagrams illustrating a cylinder end 505 that includes a tapered protrusion 510, according to an example embodiment of the present invention. As shown in FIGS. 5A and 5B, the cylinder end 505 can include, instead of slots, a tapered protrusion ("ramp") 510 that is configured to adjustably align with the opening 305 of the shock tube 130. Alignment of the shock tube opening 305 at various points of the tapered protrusion 510 results in different resulting orifice sizes. Thus, the size of the resulting orifice may be adjusted, for example, by rotating the shock tube 130 such that the shock tube opening 305 aligns with a particular part of the tapered protrusion 510. As an example, the tapered protrusion 510 of the cylinder end 505 may taper from a zero-depth projection (its starting point) above the surface plane 515 of the cylinder end 505 to a maximum point (its end point) about 350 degrees, for example, circumferentially away from the starting point. The maximum point may be approximately the size of the shock tube opening 305. In such a construction, rotating the shock tube 130 with respect to the cylinder end 505 results in a virtually infinitely adjustable hydraulic orifice, as the motion of the shock tube opening 305 relative to the changing height of the cylinder end tapered protrusion 510 acts to open or close the resulting orifice.

In another embodiment, the cylinder end may include one or more tapered ramp profile(s), where a ramp begins at a minimum depth (e.g., zero) and increases in depth circumferentially until reaching a maximum depth a certain rotational distance away from the minimum. In such case, the opening 305 of the shock tube 130 is paired with a particular depth of the tapered ramp, creating an orifice size dependent on the rotational relative position of the shock tube and cylinder end. In this construction, rotating the shock tube 130 with respect to the cylinder end results in a virtually infinitely adjustable hydraulic orifice. For embodiments including one ramp (tapered protrusion), the ramp may start at a depth of zero projection, for example, above the surface plane of the cylinder end and end at a maximum projection about 350 degrees circumferentially away from the starting point. For embodiments including two ramps, each ramp may start at a unique minimum projection and end at a unique maximum projection about 170 degrees circumferentially away from the starting point of the particular ramp. Thus, each ramp can have a different taper profile. It will be appreciated by one skilled in the art, given the above description, that the cylinder end may have any number of such ramps.

While this invention has been particularly shown and described with references to example embodiments thereof, it will be understood by those skilled in the art that various changes in form and details may be made therein without departing from the scope of the invention encompassed by the appended claims.

What is claimed is:

1. A recoil shock absorber for a firearm, the recoil shock absorber comprising:
   a body assembly configured to be installed in a stock of the firearm, the body assembly including:
      a shock tube including an opening at a distal end;
      a cylinder end rotatably coupled to the shock tube at the distal end of the shock tube, the cylinder end including multiple openings configured to be selectably aligned with the shock tube opening; and
      an accumulator chamber coupled to the cylinder end, the shock tube arranged on a first side of the cylinder end and the accumulator chamber arranged on a second side of the cylinder end, opposite the first side, alignment of the shock tube opening with any one of the cylinder end openings forms a resulting orifice and pathway from the shock tube, through the cylinder end, and to the accumulator chamber;
   a plunger assembly slidably coupled to the body assembly, the plunger assembly including a piston at a proximal end of the shock tube, the piston and the shock tube being in slidable relation such that when the plunger assembly is introduced into the body assembly the piston is introduced into the shock tube; and
   a return spring coupled to the piston and the shock tube.

2. The recoil shock absorber as in claim 1, wherein the shock tube opening is selectably aligned with any one of the cylinder end openings by rotating the shock tube using an interface at a proximal end of the plunger assembly.

3. The recoil shock absorber as in claim 2, wherein the shock tube is configured to be adjusted to enable partial alignment of the shock tube opening with any one of the cylinder end openings.

4. The recoil shock absorber as in claim 2, wherein the shock tube is configured to be rotated using a choke key.

5. The recoil shock absorber as in claim 1, wherein any one of the cylinder end openings are of a different size than any other of the cylinder end openings, wherein a resulting orifice formed by alignment of the shock tube opening with any one of the cylinder end openings is a different size than a resulting orifice formed by alignment of the shock tube opening with any other of the cylinder end openings.

6. The recoil shock absorber as in claim 1, wherein the cylinder end includes at least one return path with a check valve.

7. The recoil shock absorber as in claim 1, further including an over-pressurization relief mechanism configured to vent excess pressure to the accumulator chamber while allow the recoil shock absorber to continue to function as a shock absorber.

8. The recoil shock absorber as in claim 1, wherein the return spring comprises a mechanical spring element configured to provide a progressive force rate over a linear stroke of recoil shock absorber.

9. The recoil shock absorber as in claim 1, wherein the return spring comprises multiple mechanical spring elements, each mechanical spring element is configured to provide a force rate over a linear stroke of the recoil shock absorber that is different than a force rate of any other of the mechanical spring elements.

10. The recoil shock absorber as in claim 9, wherein at least one of the multiple mechanical spring elements is configured to provide a progressive force rate over the linear stroke of recoil shock absorber.

* * * * *